(12) United States Patent
Hansen et al.

(10) Patent No.: US 7,628,950 B2
(45) Date of Patent: Dec. 8, 2009

(54) METHOD AND TOOLING FOR SLITTING A THERMOFORMED CONTAINER AND CONTAINER FORMED THEREBY

(76) Inventors: Ty A. Hansen, 3354 Lyle Rd., Beaverton, MI (US) 48612; Michael P. Witer, 255 Van Dyke Rd., Beaverton, MI (US) 48612

(*) Notice: Subject to any disclaimer, the term of this patent is extended or adjusted under 35 U.S.C. 154(b) by 555 days.

(21) Appl. No.: 11/442,648

(22) Filed: May 25, 2006

(65) Prior Publication Data
US 2008/0263942 A1  Oct. 30, 2008

(51) Int. Cl.
*B29C 51/00* (2006.01)
(52) U.S. Cl. ............... 264/544; 264/320; 264/138; 47/65.5; 206/423
(58) Field of Classification Search ............ 47/65.5; 425/56, 47, 451.9, 383, 384; 264/138, 163, 264/294, 320, 544; 206/423; 249/52; 83/14, 83/16; 220/657
See application file for complete search history.

(56) References Cited

U.S. PATENT DOCUMENTS

| 6,648,624 | B1 | 11/2003 | Foor et al. | |
| 7,033,536 | B2 | 4/2006 | Martin | |
| 2001/0002519 | A1* | 6/2001 | Skinner | 47/65.5 |
| 2002/0079617 | A1* | 6/2002 | Kageyama et al. | 264/322 |
| 2004/0113329 | A1* | 6/2004 | Martin | 264/547 |

* cited by examiner

*Primary Examiner*—Richard Crispino
*Assistant Examiner*—Scott W Dodds
(74) *Attorney, Agent, or Firm*—John R. Benefiel

(57) ABSTRACT

An open-topped container has an outwardly turned rim extending around the open top a thermoformed body of the containers with the rim formed by a clamping ring which has one or more projections each forming an indentation into the rim. Trim tooling subsequently forms a slit through the bottom wall of each indentation able to receive a flat plastic display inserted therein.

2 Claims, 5 Drawing Sheets

METHOD AND TOOLING FOR SLITTING A THERMOFORMED CONTAINER AND CONTAINER FORMED THEREBY

BACKGROUND OF THE INVENTION

This invention concerns thermoformed products, and in particular open-topped plastic containers such as plant pots, formed with a rim which is slitted to receive a display insert.

Bedding plants are usually sold in rimmed pots or trays, and in the past, small display inserts printed with information such as the name of the plant, type, etc. were stuck into the soil in the pots. Such inserts were easily dislodged, removed, or switched to other containers by customers.

A display insert has been heretofore developed which is placed into a slit in the container rim with a locking action created by a barbed shape preventing removal.

In the thermoforming process, portions of a preheated plastic sheet material is stretched into a mold cavity in a tooling die, using plug assists and differential fluid pressure in a well known manner.

The containers so formed are subsequently cut free from the rest of the sheet in a trim station, using trim dies.

The regions surrounding portions of the sheet material to be formed into the container are clamped with clamping rings associated with each container mold cavity. A plug assist for each mold cavity is advanced into the sheet material to prestretch the material prior to application of the fluid pressure which is thereby applied to cause the material to be drawn into intimate contact with the mold cavities.

A through slot could possibly be molded to the rim during the thermoforming process by a mold feature, but this approach increases tooling costs since a special tooling feature must be provided for each cavity and a large number of cavities are typically employed, i.e., 24 or more cavities is typical for this type of product. Furthermore the need to mold in such a feature complicates the thermoforming process since only minimal space available in that area of the tooling.

Punching slots into the relatively thick rim after forming the containers requires a delicate punch and die set, prone to failure and also increasing the tooling costs.

More importantly, separate slugs would be produced by a punching process, and removing these slugs from the tooling is typically difficult. The presence of slugs which are not removed can create jams and other problems. Even if removed, disposal of the slugs is another burden.

As noted, the rim of the containers so formed is thicker than the body wall since a portion of the sheet material is stretched out during forming of the body while the rim is formed without stretching. This thick rim material is difficult to cut and thin knife blades will break easily if slitting is done in the trimming operation, to thus require a punch and die set.

Once slits are formed in the rim, the relatively thin plastic inserts are difficult to insert into a slit, particularly through an arcuate slit in the thick rim of a round container. If a punched out slot is formed to allow easier insertion, the expensive and delicate punch and die sets would be required. Also, slugs are formed creating problems as described above.

Furthermore, a high tonnage trim press would be required to perform the punching process, particularly when other steps are required to be done at the same time, such as to punch out bottom holes in the body portion.

It is the object of the present invention to provide an improved method and tooling to produce a thermoformed open-topped container having one or more slits in the rim thereof.

It is a further object to provide a thermoformed open topped product with slitted rim configuration which allows easy installation of a display insert into a slit in the rim.

SUMMARY OF THE INVENTION

These objects and other objects which will become understood upon a reading of the following specification and claims are achieved by a process and thermoforming tooling which first forms one or more elongated indentations in the rim by a coining process executed during the forming stage. Clamping rings used to clamp the perimeter of sheet portions for each container are formed with one or more projecting coining features arranged about the perimeter thereof which act to form corresponding elongated indentations into the top of the rim. A series of such indentations may be arrayed about each rim with a thin bottom wall of each indentation being substantially thinner than the thickness of the remaining portions of the rim.

A trim die set is thereafter used to cut a slit through the thin bottom wall of each of the indentations during the trimming phase of the process. Relatively durable cutting features are formed on a trim die cutter piece which are easily able to penetrate the thin bottom wall of the coined indentations to minimize the press tonnage requirements.

No slugs are formed to eliminate the problems associated therewith as described above.

Since only a more limited number of trim dies are needed to successively slit the rims of one or more rows of containers in the trim station, additional tooling costs are minimal.

DESCRIPTION OF THE DRAWING VIEWS

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 3:
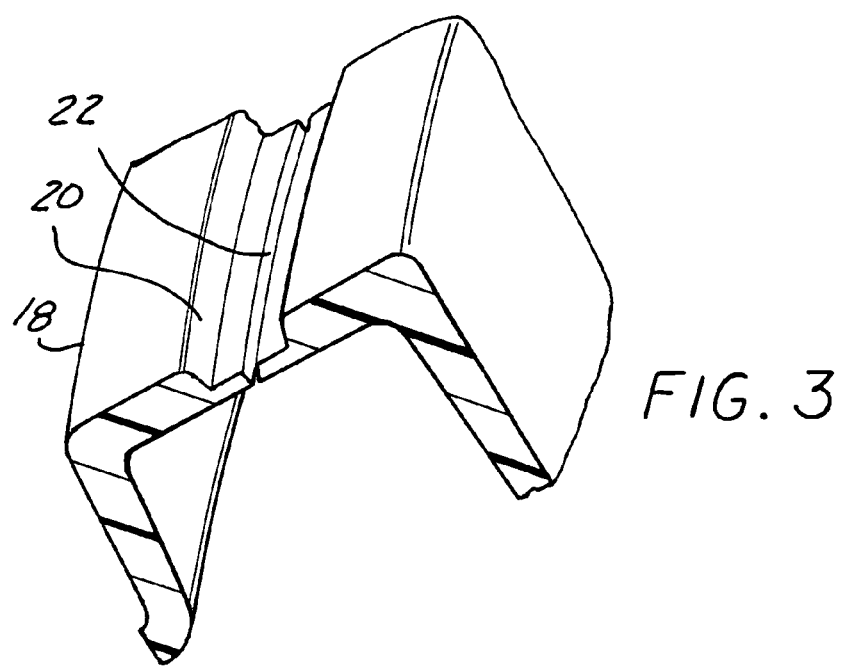
FIG. 3 is a further enlarged sectional view of a fragmentary portion of rim section of the container shown in FIG. 1 showing an indentation bottom wall and slit cut therein.
Figure 2:
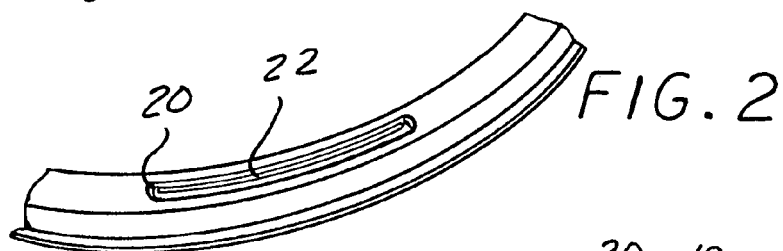
FIG. 2 is an enlarged fragmentary top view of a rim section of the container shown in FIG. 1.
Figure 1:
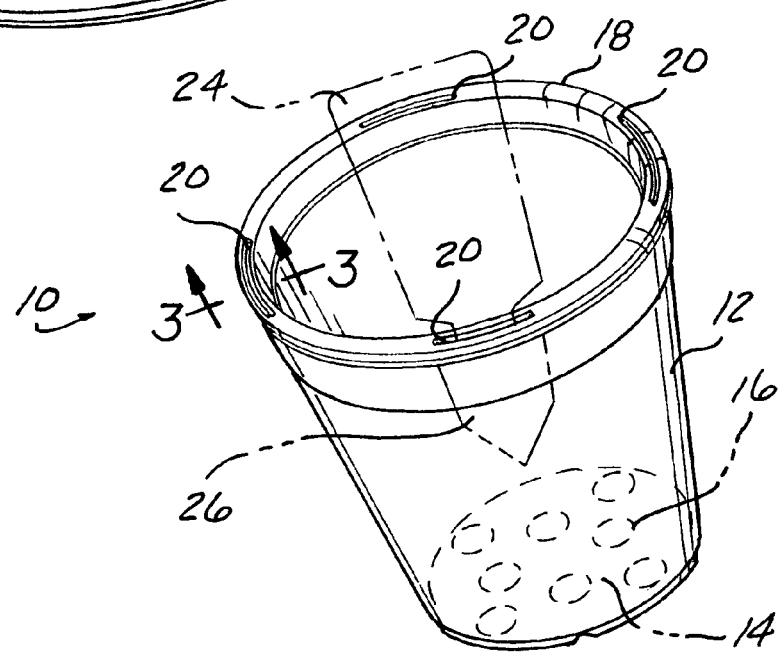
FIG. 1 is a pictorial view of an open topped plant container with rim slits formed by the method of the present invention.

Referring to the drawings, and particularly FIGS. 1-3, a round plastic flower pot container 10 is shown, made by a thermoforming process in which areas of a plastic sheet material are shaped in the manner generally well known in the art.

The container 10 is comprised at an open-topped body portion 12, having a bottom wall 14 formed with a number of drain holes 16.

An outwardly turned rim 18 extending about the perimeter of the top of the body portion 12 has a series of flattened elongated arcuate indentations 20 formed into the upper surface of the rim 18 for a limited distance alone the rim 18. Each indentation has a lengthwise central slit 22 formed therein intermediate the width of the rim 18.

The slit 22 is designed to receive a flat plastic or paperboard display insert 24 having a bottom end 26 wider than the slit 22 so as to be captured after insertion into the slit 22 for secure retention.

Because of the nature of the forming process, the upper region and rim 18 are much thicker than the remaining body portion 12 since the body portion 12 is stretched from an area of the plastic sheet material to be substantially reduced in thickness, compared to the remaining unstretched portions of the sheet material forming the rim 18.

The indentations 20 reduce the thickness of the rim 18 to about one third the original sheet material thickness, i.e., such as from about 0.030 inches thick to about 0.010 inches thick.

These thinner rim areas can be easily cut or slit with a knife edge to not require a punching operation. At the same time, the lower part 26 of the display insert 24 can be easily inserted into a slit cut into the rim.

Tooling used to carry out the forming of the container 10 is shown in FIGS. 4-10.

Figure 4:
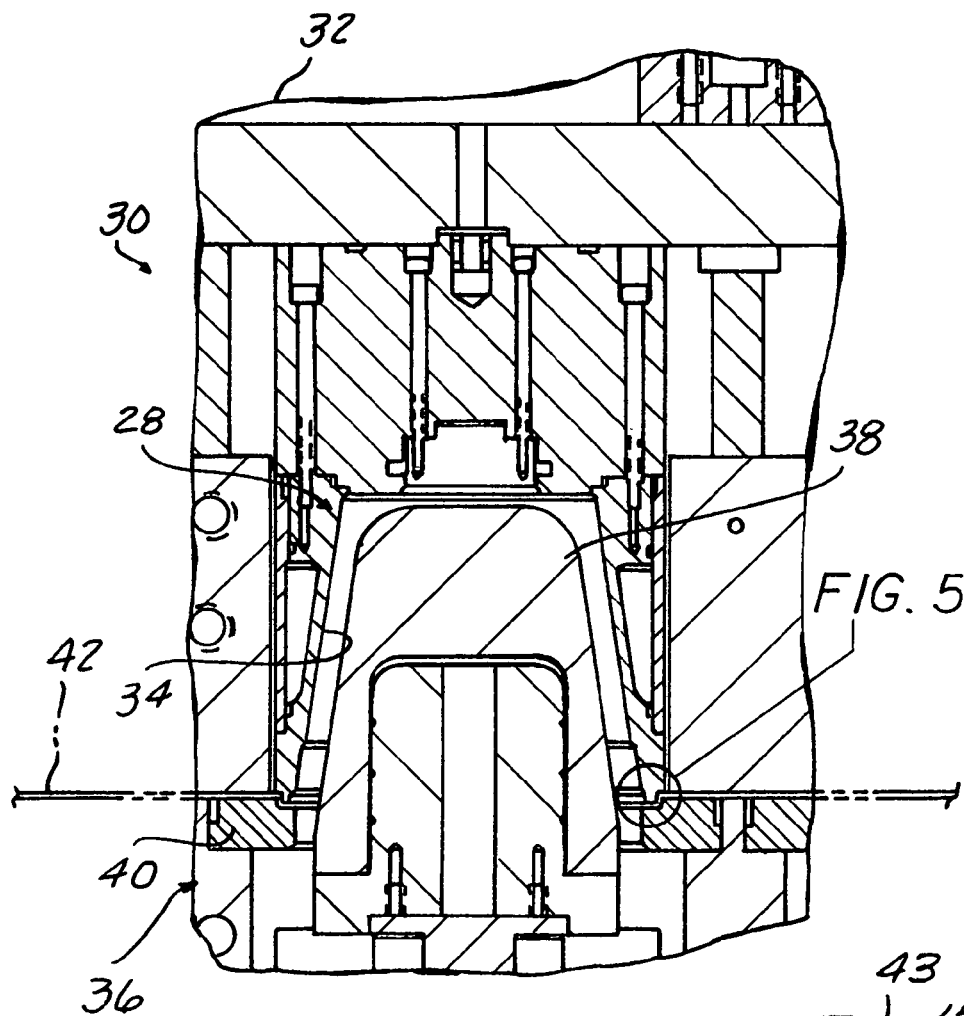
FIG. 4 is a partially sectional view of thermoforming tooling associated with a single mold cavity.
Figure 5:
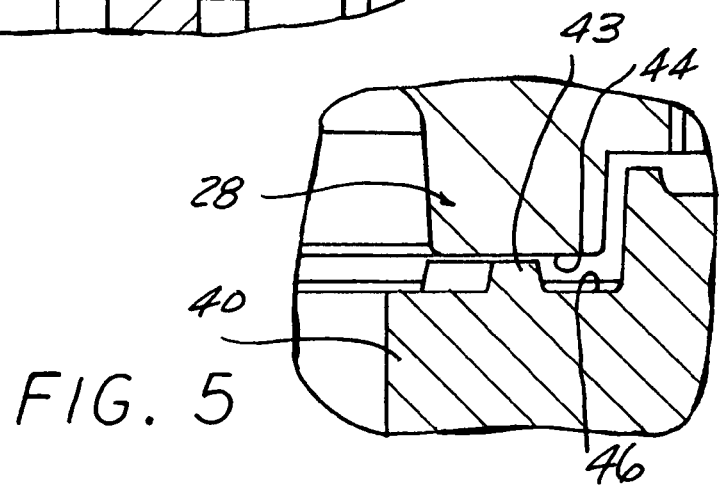
FIG. 5 is an enlarged fragmentary view of a portion of the tooling shown in FIG. 4 showing a coining feature.

FIGS. 4 and 5 depict thermoforming tooling associated with a single mold cavity. As will be understood by those skilled in the art, a rectangular array of mold cavities is typically provided in apparatus for producing such open topped container items as nursery plant pots, i.e., 6 rows by 4 rows, 3 rows by 5 rows, etc. See U.S. Pat. Nos. 6,648,624 and 7,033,536 hereby incorporated by reference herein for a description of apparatus having such a mold cavity array.

A mold part 28 is included in an upper tooling assembly 30 affixed to upper main platen 32. The mold part 28 has a mold cavity 34 formed therein.

A lower tooling assembly 36 mounted to the lower platen (not shown) includes a plug assist 38.

Preferably, a "third platen" mounts an array of plug assists 38 as described in U.S. Pat. No. 6,648,624 referenced above, so that the plug assists 38 can be advanced into the mold cavities 34, as shown, independently of the motion of the main platens as described therein.

Copending application Ser. No. 11/352,933 filed on Feb. 13, 2006 describes a preferred form of plug assist drive and is incorporated herein by reference.

A clamping ring 40 associated with each mold cavity 34 is included in the lower tooling assembly 36 which engages the plastic sheet material 42, which is advanced between the upper and lower tooling assemblies 30, 36 when the upper and lower platens are advanced towards each other to aid in stretching of the sheet material by the plug assist 38, as will be understood by those skilled in the art.

Other conventional details of the thermoforming apparatus are not here described since these are well known to those skilled in the art.

According to the concept of the present invention, the clamping ring 40 has a series of elongate arcuately shaped blunt ended projections 43 extending upward towards an end face 44 of the lower end of the mold cavity part 28.

The clamping ring 40 has a TEFLON hard coat (0.0005 inches thick) applied all over to prevent sticking to the plastic sheet material.

The sheet material 42 is clamped between the end face 46 of the clamping ring with the projections 43 and the end face 44 of the mold part 28.

Thus, the heated sheet material 42 has a corresponding series of elongated indentations 20 molded therein as the container 10 is being thermoformed, such a general process of forming indentations referred to as "coining".

The containers 10 remain attached to the sheet after forming, and the sheet with the containers 10 is transferred to trim tooling for cutting the containers 10 free from the remainder of the sheet material 42.

Figure 7:
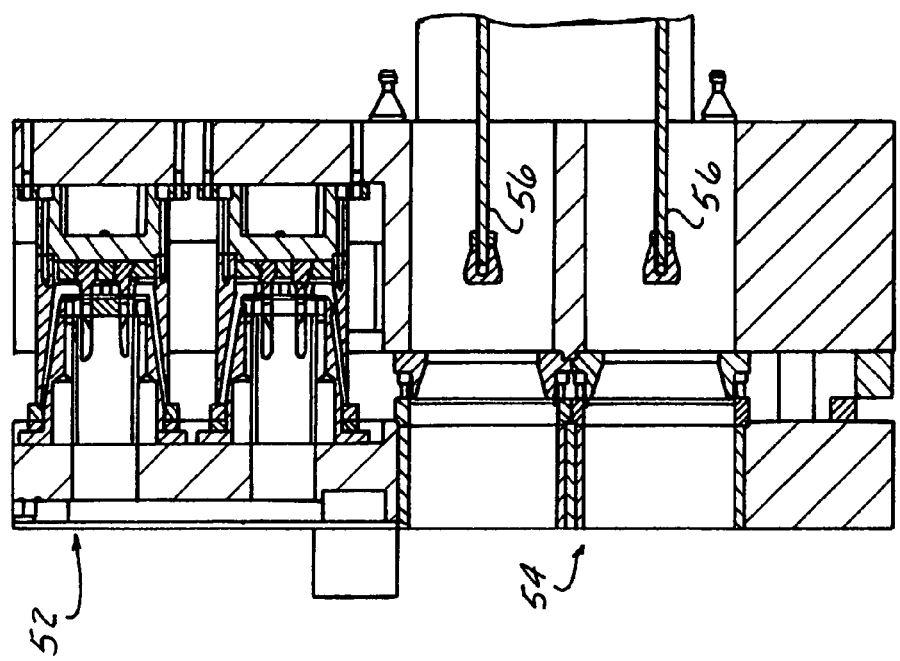
FIG. 7 is an enlarged view of the section 7-7 taken in FIG. 6.
Figure 6:
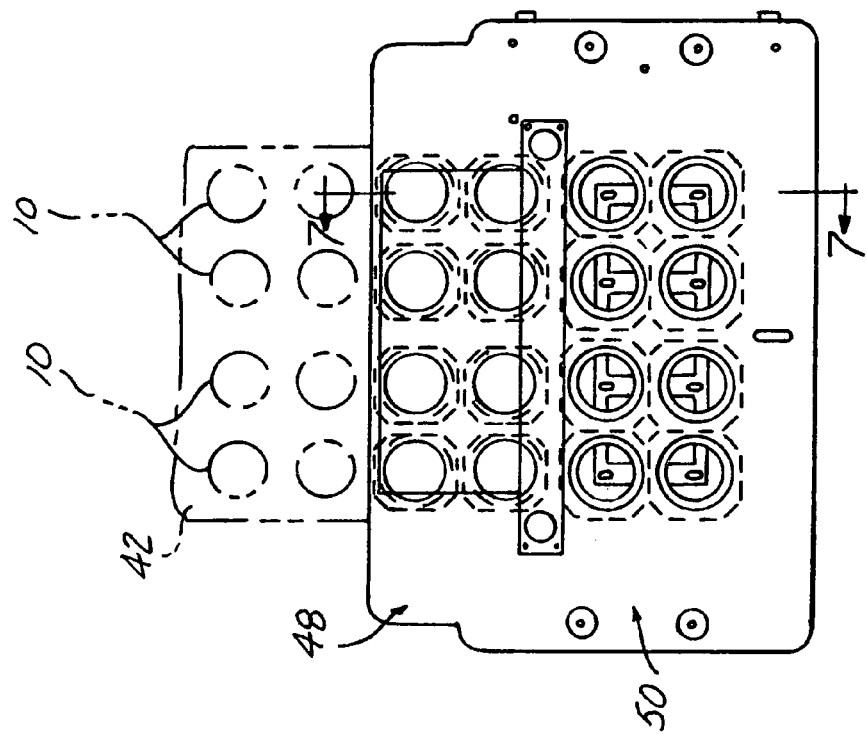
FIG. 6 is an end view of trim tooling used to cut features into the thermoformed containers including the rim slits according to the present invention, with a portion of a sheet with formed containers shown in phantom lines.

FIGS. 6 and 7 show such trim tooling. In a first station 48, features are cut into a number of rows of containers less than the total number of the rows of containers, i.e., such as eight containers (in two rows) by a first set of trim tooling 52 and thereafter these two rows are indexed into a second station 50 where the containers 10 are cut free from the sheet material 42 by a second set of trim tooling 54 and the cut free containers 10 then ejected with ejector pins 56 into a collecting tray (not shown) in a conventional manner.

Figure 8:
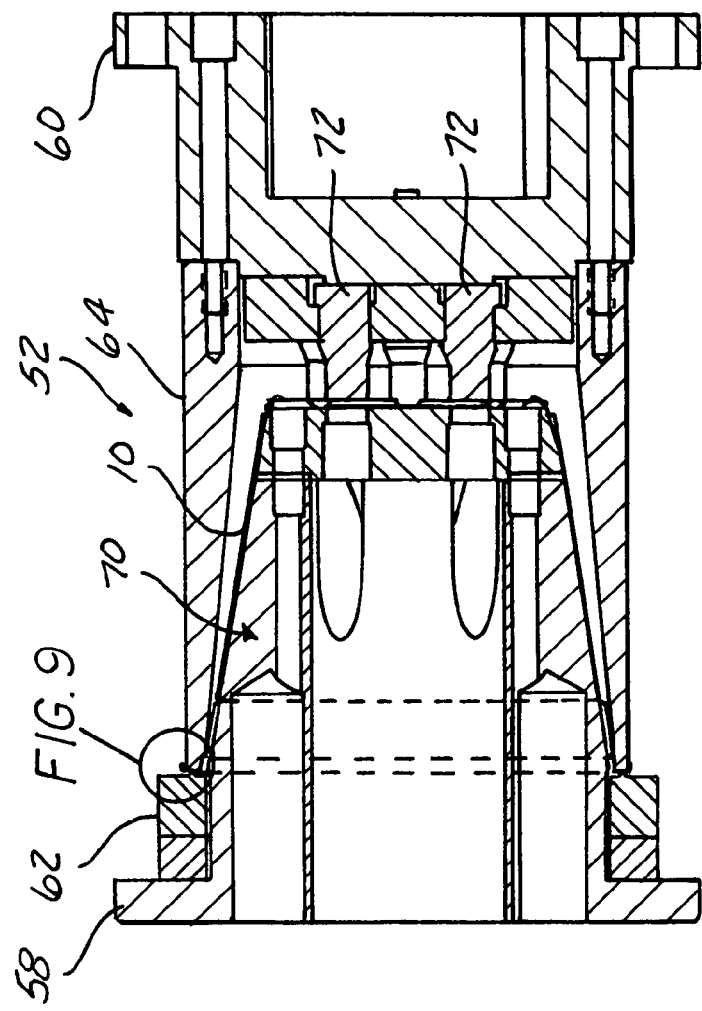
FIG. 8 is an enlarged sectional view of a rim slitting trim tooling subassembly included in the trim tooling shown in FIGS. 6 and 7.
Figure 9:
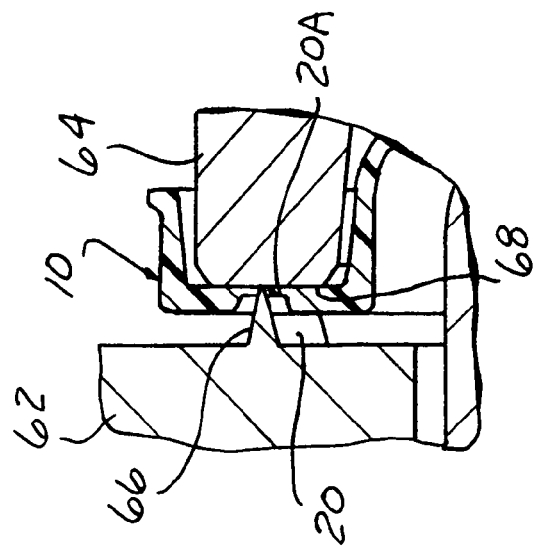
FIG. 9 is a fragmentary view of a portion of the slitting trim tooling subassembly shown in FIG. 8.
Figure 10:
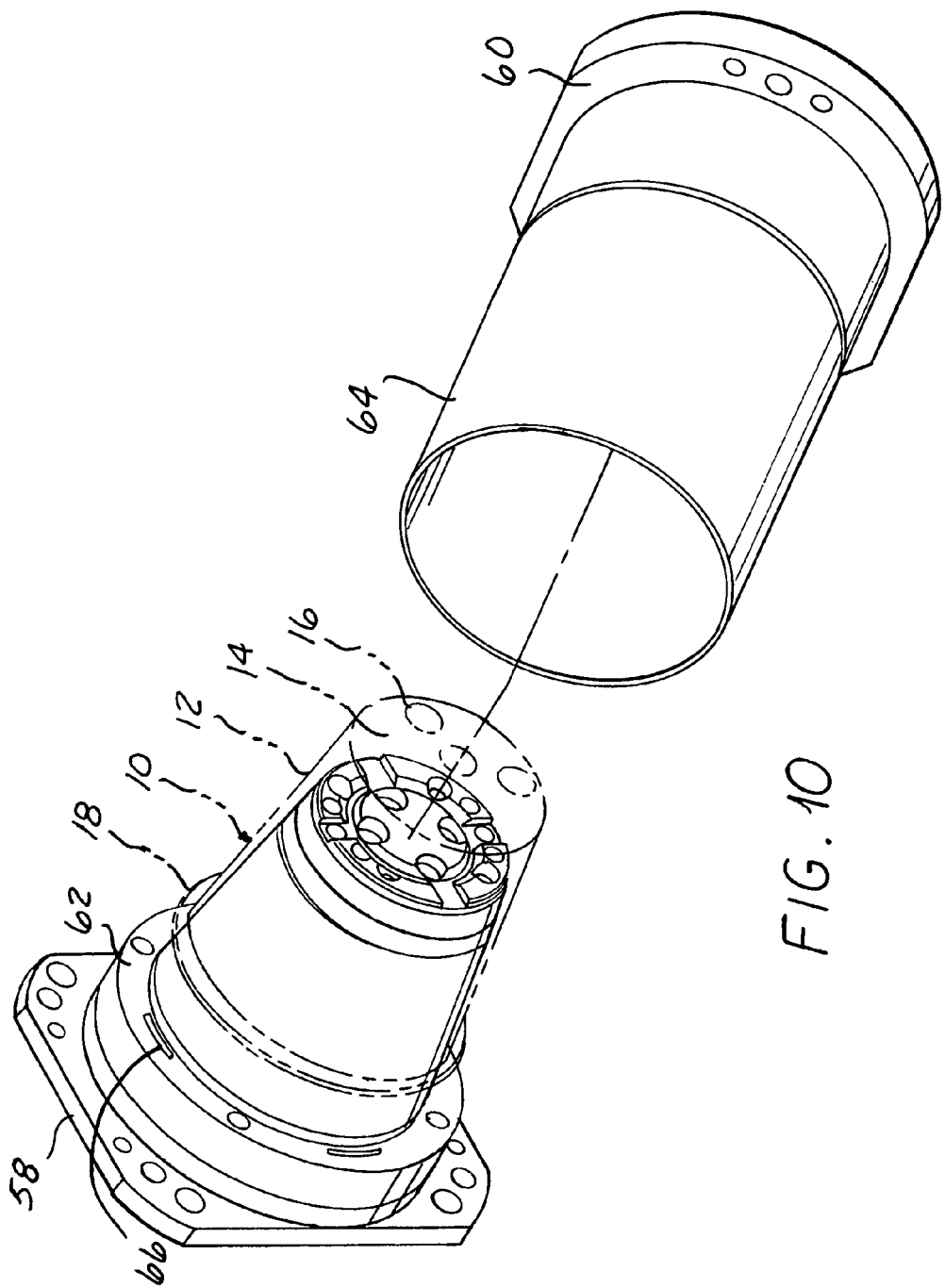
FIG. 10 is an exploded pictorial view of the components of the trim slitting tooling subassembly shown in FIG. 8.

The present invention is concerned with the first set of trim tooling 52, the components associated with a single container being shown in FIGS. 8-10.

These components include a slitting tool set including a slitting ring 62 on a holder ring 58 and an anvil cup on an opposite holder 60.

The slitting ring 58 is formed with a series of arcuate slitting blades 60 spaced apart and located to be aligned with the respective indentations 20 so as to form a slit 22 through the thin bottom wall 20A of each indentation 20, cutting against the end face 68 of the anvil cups 64.

At the same time, the container 10 is held on a die cup 70. The container bottom wall is compressed between the die cup 70 and a punch set 72 which acts to punch the holes 16 therein.

Thus, a low tonnage press can be used to perform the trimming operation and low cost durable slitting tools used to make the slits 22 because of the localized rim thinning effect of the indentations 20. The resulting slits 22 therein allow easy insertion of the insert display 24 even with arcuately shaped slits 22.

As will be appreciated, this process can be used on other rimmed container products such as rectangular plastic trays or with variously configured rims, etc.

The invention claimed is:

1. A method of making a plastic product having open-topped body and a rim extending around a perimeter of a top of said body with a slit penetrating said rim, said method including;

thermoforming said body portion from an area of a sheet of plastic material while clamping an outer perimeter of said area of said sheet portion to form said rim with a clamping member, while forming said body portion from said area;

providing a projection on said clamping member to create an indentation in said rim for limited distance along said rim so formed, said indentation at a location intermediate the width of the rim and having a flattened bottom wall about one third of the thickness of the adjacent rim portions; and slitting through said flattened bottom wall of said indentation to form a slit extending lengthwise along said flat bottom wall of said indentation.

2. The method according to claim 1 wherein a plurality of indentations are formed spaced along said rim, and said bottom wall of each indentation is slit along said indentation.

* * * * *